United States Patent Office 3,575,998
Patented Apr. 20, 1971

3,575,998
OXADIAZOLYL-SUBSTITUTED NITROIMIDAZOLES
Burton G. Christensen, Scotch Plains, and Dale R. Hoff, Basking Ridge, N.J., assignors to Merck & Co., Inc., Rahway, N.J.
No Drawing. Filed Sept. 16, 1969, Ser. No. 858,538
Int. Cl. C07d 85/54
U.S. Cl. 260—307                    5 Claims

ABSTRACT OF THE DISCLOSURE

This invention relates to nitroimidazoles substituted by 1,3,4-oxadiazolinones. These novel compounds have anti-bacterial activity, especially against Streptomyces and Salmonella. The compounds also show anti-coccidial activity against various species of Eimeria.

---

This invention relates to nitroimidazoles substittued by 1,3,4-oxadiazolinones of the following formula:

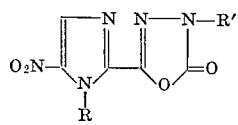

wherein R is hydrogen, loweralkyl or 2'-hydroxyethyl, and R' is hydrogen or loweralkyl. These novel compounds have anti-bacterial activity, especially against Streptomyces and Salmonella. The compounds are also active against Eimeria.

This invention relates to nitroimidazoles substituted by 1,3,4-oxadiazolinones. More particularly, it relates to compounds having the following formula:

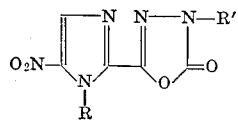

I wherein R is hydrogen, loweralkyl, or 2'-hydroxyethyl, and R' is hydrogen or loweralkyl. The term "loweralkyl" means an alkyl radical having 1–6 carbon atoms.

When R' is hydrogen, it is understood that the compounds may exist in the tautomeric hydroxy form. The tautomer has the following structure:

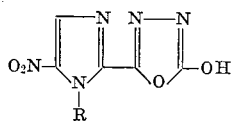

II

These compounds have utility as anti-bacterial agents, with particular efficacy against *Streptomyces pyogenes* and *Salmonella schottmuelleri*. The compounds also are anti-coccidial agents against various species of Eimeria, for instance, *E. tenella* and *E. brunetti*.

Specific compounds encompassed by this invention include the following:

2-(5-hydroxy-1,3,4-oxadiazol-2-yl)-1-methyl-5-nitroimidazole;
2-(5-hydroxy-1,3,4-oxadiazol-2-yl)-1-ethyl-5-nitroimidazole;
2-(5-hydroxy-1,3,4-oxadiazol-2-yl)-1-propyl-5-nitroimidazole;
2-(5-hydroxy-1,3,4-oxadiazol-2-yl)-1-(2'-hydroxyethyl-5-nitroimidazole;
2-(4-methyl-5-keto-1,3,4-oxadiazolin-2-yl)-1-methyl-5-nitroimidazole;
2-(4-ethyl-5-keto-1,3,4-oxadiazolin-2-yl)-1-methyl-5-nitroimidazole.

These compounds can be prepared using the following reaction processes:

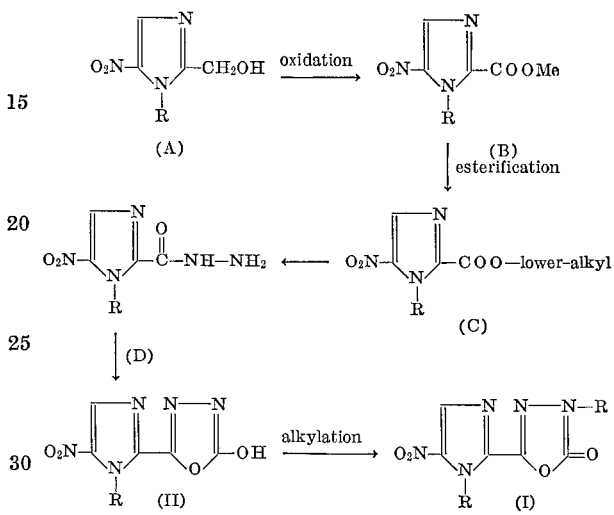

When R is hydrogen or loweralkyl, the starting compounds for this invention, 2-hydroxymethyl-5-nitroimidazole, and 1-loweralkyl-2-hydroxymethyl-5-nitroimidazole, are known in the art. The compounds can be prepared following the procedure described in Belgium Pat. 683,796, issued Jan. 9, 1967.

The chosen 1 - R - 2-hydroxymethyl-5-nitroimidazole (Compound A) is then oxidized using nitric acid or potassium permanganate, for example, to an alkali metal salt of 1-R-2-carboxy-5-nitroimidazole (Compound B). Compound B is then esterified via the formation of an acid chloride, followed by treatment with a lower alcohol to a loweralkyl ester (Compound C), and then reacted with excess hydrazine to prepare 1-R-2-carbazoyl-5-nitroimidazole (Compound D). Compound D is then reacted with a molecular excess of a cyclization agent to form the oxadiazolone or oxadiazolinone ring. Generally speaking, this cyclization agent can be an organic compound containing a chlorocarbonyl moiety, i.e.,

wherein R can be a radical such as chloro, halo, ethoxy, lower alkoxy, and the like. The preferred reagent is phosgene, and ethylchloroformate can also be used. This reaction takes place in a solvent such as water, dioxane, ethanol, or diethylene glycoldimethylether to prepare the desired cyclic Compound II, 2-(5-hydroxy-1,3,4-oxadiazol-2-yl)-1-R-5-nitroimidazole. This latter compound can then be isolated or N-alkylated to 2-(4-R-5-keto-1,3,4-oxadiazolinyl)-1-R-5-nitroimidazole. The alkylation can be effected by treating with an alkyl halide or alkyl sulfonate in a suitable solvent such as alcohol, dimethylformamide and in the presence of a base such as $K_2CO_3$, NaH, or NaOH for the desired period of time.

When R is 2'-hydroxyethyl, the nitroimidazole starting material is 1-(2'-hydroxyethyl)-5-nitroimidazole-2-carboxylic acid-α-lactone,

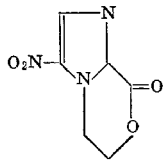

the preparation of which is described in U.S. Pat. 3,390,-150. This compound is treated with excess hydrazine to produce 1 - (2' - hydroxyethyl)-2-carbazoyl-5-nitroimidazole.

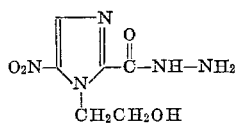

This latter compound can then be treated with phosgene following the procedure outlined above.

The nitroimidazole derivatives described herein have significant anti-bacterial activity against a large number of pathogens. They are useful antimicrobial agents, which are active in inhibiting the growth of both gram-positive and gram-negative pathogenic bacteria. Illustrative of such pathogens are *Streptomyces pyogenes* and *Salmonella schottmuelleri*. Thus, nitroimidazoles substituted with 1,3,4-oxadiazolinones can be used as antiseptic agents to remove susceptible organisms from pharmaceutical, dental and medical equipment and other areas subject to infection by such organisms, and to inhibit harmful bacterial growth in industrial paints. Similarly, they can be used to separate certain micro-organisms from mixtures of micro-organisms. They are useful in the treatment of diseases caused by bacterial infections in man and animals and are particularly valuable in this respect, since they are active against many strains of pathogens resistant to previously available antibiotics.

The nitroimidazole compounds are also useful in the treatment of coccidiosis, a poultry disease. Coccidiosis is caused by various species of *Eimeria*, such as *E. brunetti* and *E. tenella*.

When the nitroimidazoles are used for combatting bacteria in man or lower animals or for treating coccidiosis in fowl, they may be administered orally in a dosage form such as capsules or tablets, or in a liquid solution or suspension. These formulations may be prepared using diluents, granulating agents, preservatives, binders, flavoring agents and coating agents known to those skilled in this particular art. Alternatively, they may be administered parenterally by injection in a sterile vehicle, and for this it is normal to use a salt that is soluble in the liquid vehicle.

EXAMPLE 1

2-(5-hydroxy-1,3,4-oxadiazol-2-yl)-1-methyl-5-nitroimidazole

The starting compound, 100 mg. of 1-methyl-2-hydroxymethyl-5-nitroimidazole is oxidized by adding to 400 ml. of concentrated sulfuric acid with stirring. This is followed by the addition of 140 ml. of 70% nitric acid. The solution is heated for three days at 75–80° C. The mixture is poured into ice and the solids filtered. After washing with water and drying, 75 ml. of 1-methyl-2-carboxyl-5-nitroimidazole are obtained. This acid is dissolved in ethanol and chilled to 0° C. A 1:N equivalent of ethanolic potassium hydroxide is added. The mixture is stirred at 0–5° C. The potassium salt mixture is then treated with 91 ml. of dimethyl sulfate and 0.4 ml. of dimethyl sulfoxide at 60° C. for one hour. The reaction mixture is cooled to room temperature and the product filtered out. The compound obtained after purification is 1-methyl-2-carboxymethyl-5-nitroimidazole.

4.33 g. of the above ester are dissolved in a small amount of ethanol and 1 ml. of hydrazine hydrate is added after several minutes. A product is precipitated which is then filtered and washed with cold ethanol. The crude product obtained (3.99 g.) is dissolved in pure dioxane. Phosgene is bubbled through the solution for one hour at room temperature. After 20 minutes of phosgene reaction, precipitation occurs. At the end of the reaction time, the mixture is filtered and washed with dioxane and petroleum ether. 3.91 g. of product are obtained having a melting point of 267–270° C. with decomposition. The product is identified as 2-(5-hydroxy-1,3,4-oxadiazol-2-yl)-1-methyl-5-nitroimidazole.

Using the above procedure 2-(5-hydroxy-1,3,4-oxadiazol - 2 - yl) - 1-ethyl-5-nitroimidazole and 2-(5-hydroxy-1,3,4 - oxadiazol - 2-yl)-1-propyl-5-nitroimidazole can be prepared from the starting compounds 1-ethyl-2-hydroxymethyl-5-nitroimidazole and 1-propyl-2-hydroxymethyl-5-nitroimidazole, respectively.

EXAMPLE 2

2-(4-methyl-5-keto-1,3,4-oxadiazolin-2-yl)-1-methyl-5-nitroimidazole

Using the product obtained in Example 1, .50 g. are dissolved in ethanol and .50 ml. of methyl iodide added. The reaction mixture is brought to 80° C. and allowed to remain for 24 hours. An additional 0.50 ml. of methyl iodide is added and reflux is continued for 24 hours. Then the reaction mixture is concentrated in vacuum, treated with dilute aqueous $NaHCO_3$ solution and the remaining solid is collected by filtering. The product is identified as 2 - (4 - methyl - 5-keto-1,3,4-oxadiazolin-2-yl)-1-methyl-5-nitroimidazole.

The correspondingly substituted ethyl- and propyl-derivatives of the above compound can be prepared by using ethyl iodide and propyl iodide, respectively, in the process described above. The products obtained are 2-(4-ethyl - 5 - keto - 1,3,4 - oxadiazolin-2-yl)-1-methyl-5-nitroimidazole and 2-(4-propyl-5-keto-1,3,4-oxadiazolin-2-yl)-1-methyl-5-nitroimidazole, respectively.

EXAMPLE 3

2-(5-hydroxy-1,3,4-oxadiazol-2-yl)-1-(2'-hydroxyethyl)-5-nitroimidazole 150 mg. of the starting material, 1-(2'-hydroxyethyl)-5-nitroimidazole-2-carboxylic acid-α-lactone is dissolved in 20 ml. of 150 mg. of hydrazine hydrate are added and the reaction mixture is refluxed for one hour. The solution is then concentrated to dryness in vacuo, and the residue is recrystallized from ethyl acetate to give 1-(2'-hydroxyethyl) - 2 - carbazoyl-5-nirtoimidazole. This material is used without further purification for the next step.

This latter hydroxide (1.5 g.) is then treated following the procedure of Example 1, using the processes outlined there, until the product 2-(5-hydroxy-1,3,4-oxadiazol-2-yl)-1-(2'-hydroxyethyl)-5-nitroimidazole is obtained.

EXAMPLE 4

2-(4-methyl-5-keto-1,3,4-oxadiazolin-2-yl)-1-(2'-hydroxyethyl)-5-nitroimidazole

The final product of Example 3, 2-(5-hydroxy-1,3,4-oxadiazolyl-2)-1-(2'-hydroxyethyl)-5-nitroimidazole (0.5 g.) is treated with 1.0 ml. of methyl iodide in 20 ml. of ethanol at 80° C. for 48 hours. The reaction mixture is then treated to isolate the desired product, 2-(4-methyl-5-keto - 1,3,4-oxadiazolin-2-yl)-1-(2'-hydroxyethyl)-5-nitroimidazole.

Using ethyl iodide and butyl iodide in the above process, 2 - (4 - ethyl-5-keto-1,3,4-oxadiazolin-2-yl)-1-(2'-hydroxyethyl)-5-nitroimidazole and 2-(4-butyl-5-keto-1,3,4-oxadiazolin-2-yl)-1-(2'-hydroxyethyl)-5-nitroimidazole are prepared, respectively.

We claim:
1. A nitroimidazole of the formula:

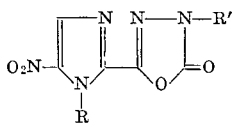

wherein R is hydrogen, loweralkyl, or 2'-hydroxyethyl, and R' is hydrogen or loweralkyl.

2. The compound of claim 1 wherein R is methyl and R' is hydrogen.
3. The compound of claim 1 wherein R and R' are methyl.
4. The compound of claim 1 wherein R is methyl and R' is ethyl.
5. The compound of claim 1 wherein R is 2'-hydroxyethyl and R' is hydrogen.

References Cited

UNITED STATES PATENTS

| | | | |
|---|---|---|---|
| 2,918,473 | 12/1959 | Sherman | 260—307 |
| 3,410,863 | 11/1968 | Boesch et al. | 260—307 |
| 3,452,035 | 6/1969 | Berkelhammer et al. | 260—306.8 |

ALEX MAZEL, Primary Examiner

R. V. RUSH, Assistant Examiner

U.S. Cl. X.R.

260—309; 424—272